United States Patent [19]

Eldridge

[11] Patent Number: 4,713,521
[45] Date of Patent: Dec. 15, 1987

[54] ELECTRONIC POTENTIOMETER SIMULATOR

[75] Inventor: Richard A. Eldridge, Chicago Ridge, Ill.

[73] Assignee: ESAB Welding Products, Inc., Chicago, Ill.

[21] Appl. No.: 672,545

[22] Filed: Nov. 16, 1984

[51] Int. Cl.⁴ .............................................. B23K 9/10
[52] U.S. Cl. ......................... 219/130.5; 340/347 DA
[58] Field of Search .......... 219/130.5, 130.51, 137 PS, 219/130.21, 130.31, 130.32, 130.33; 340/347 DA

[56] References Cited

U.S. PATENT DOCUMENTS 4,233,591 11/1980 Murata et al. ................ 340/347 DA
4,521,672 6/1985 Fronius .......................... 219/130.51

Primary Examiner—Clifford C. Shaw
Attorney, Agent, or Firm—James G. Staples

[57] ABSTRACT

A welding power system is described wherein a programmable controller and a conventional power supply are coupled by a circuit which simulates a control potentiometer. The coupling circuit provides an adjustable output signal intermediate between high and low potentials depending upon the level of an input control signal. The coupling circuit converts the input control signal into a pulse width modulated signal, multiplexes the high and low potentials in accordance with the pulse width modulated signal, and time-averages the multiplexed signal to provide an output control signal. An optical isolator is preferably included for direct current isolation of the input and output signals.

1 Claim, 2 Drawing Figures

ELECTRONIC POTENTIOMETER SIMULATOR

BACKGROUND OF THE INVENTION

A potentiometer is an circuit element comprising a resistor which has a movable tap for adjusting the ratio of the resistances from the tap to the respective ends of the resistor. A frequent application of a potentiometer is to obtain a control signal which is intermediate between the electrical potentials present at its opposite ends. Such use of potentiometers is common in circuits for controlling amplifiers, power supplies and other electrical and electronic devices. The desired control signal is obtained from the tap by adjustment of its location.

Sometimes it is desirable to control a device with an electrical signal from a separate circuit. One such application is robotic welding where a welding power supply is coupled to a programmable controller for automatically controlling the welding process. In such coupling, it is necessary to adapt the output of the controller to the control circuitry of the power source. Further, it is frequently essential to provide direct current isolation between the programmable controller and the welding power source. One possible solution is to use the controller output and a servomotor to drive the tap of a potentiometer in the power source to the desired position.

One welding power source which has been used for robotic welding is the PULSE ARC 350 welding power source available from the Airco Welding Products Division of The BOC Group, Inc. This power supply adjusts the welding current in response to a control signal in the range 0 to 10 volts. In the manual control mode this signal is obtained by adjustment of a potentiometer. The welding current control has been automated by coupling a programmable controller to the welding current control circuit by means of a conventional dc-dc isolation device. This device linearly converted a 0 to 10 volt input level from the controller into a 0 to 10 volt output for power source control while providing no dc current path from the controller to the output power source.

A further feature of the above mentioned welding power source enables the welding arc voltage to be adjusted within a range about a nominal value. Again, the arc voltage can be manually trimmed by setting a control potentiometer. In this situation, however, the potentiometer is in the arc voltage feedback loop and the voltage trim control signal must have the desired proportion intermediate between the high and low potentials across the potentiometer. Since these high and low potentials are floating and vary with the feedback signal, it is not possible to use a simple dc-dc isolation device as described above in connection with the welding current control.

The electronic potentiometer simulator of the present invention is suitable for substitution for each of the control potentiometers in the welding power system just described to enable a programmable controller to control both the welding current and the arc voltage. The potentiometer simulator is also suitable for use in many other situations where control circuitry is coupled to electrical devices.

SUMMARY OF THE INVENTION

The invention is a method and apparatus which provide an adjustable output signal intermediate between high and low potentials depending upon the level of an input control signal. Very briefly, the invention converts the input control signal into a pulse width modulated signal, multiplexes the high and low potentials in accordance with the pulse width modulated signal, and time-averages the multiplexed signal to provide an output control signal.

The potentiometer simulator circuit has several advantages. The output signal is a desired ratio between the high and low potential limits even if the potential limits increase or decrease, as they might in a floating circuit. The invention can maintain simple linearity between the input and output signals or can simulate a potentiometer having a compound liner, logarithmic or other non-linear characteristic. The invention enables complete dc current isolation between the input control signal and the output control signal. The simulator input can have minimal effect on associated circuits and the output impedance is constant and can be selected within a wide range.

DESCRIPTION OF THE PREFERRED EMBODIMENTS

Figure 1:
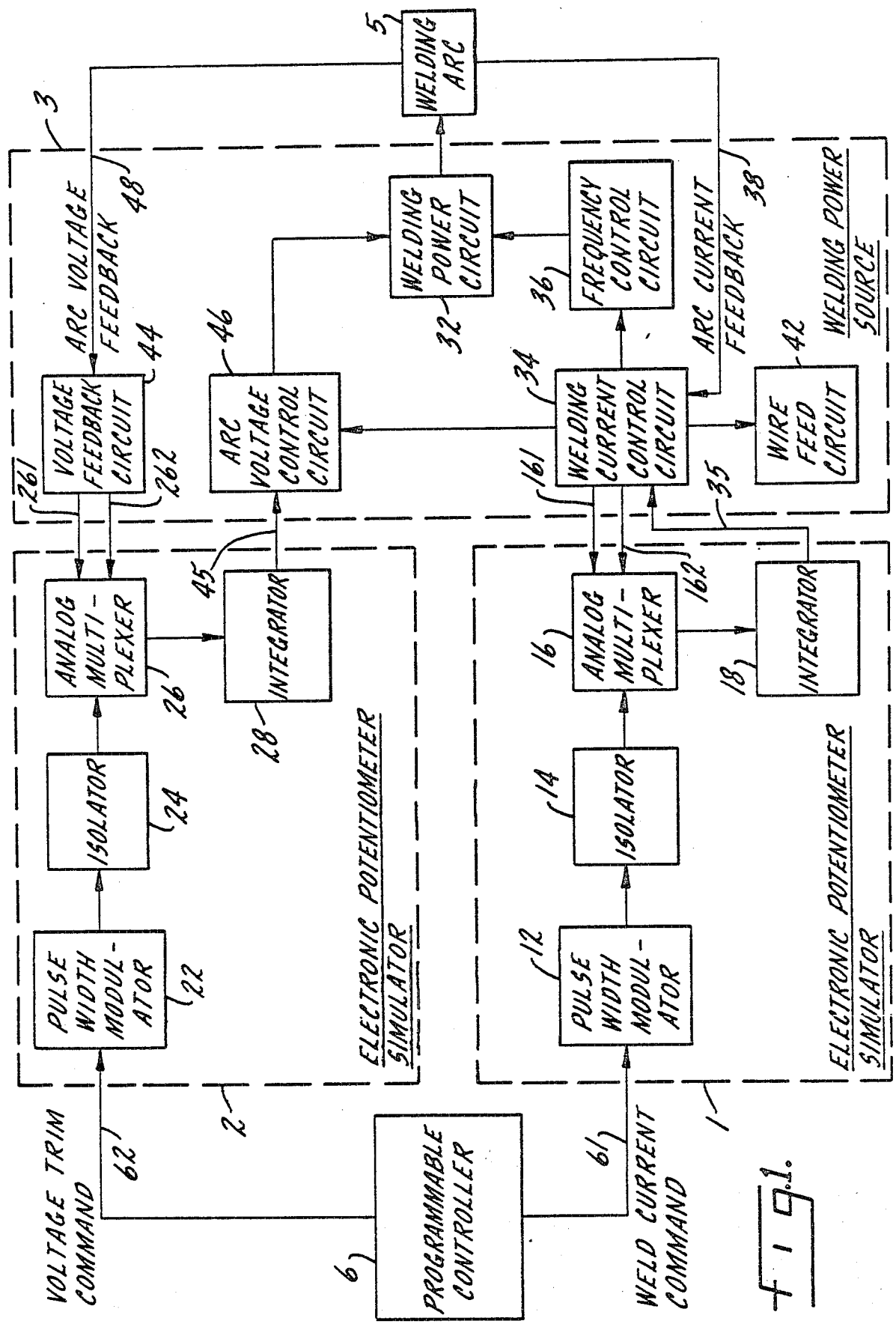
FIG. 1 is a block diagram of a welding power system incorporating two electronic potentiometer simulator circuits according to the present invention.

FIG. 1 is a block diagram of a system for providing power to a welding arc 5. The system comprises a welding power source 3, a programmable controller 6, and two electronic potentiometer simulator circuits 1, 2 connected at the interface between the power source and the controller. In the particular embodiment, the welding power source is one such as the AIRCO model mentioned above in which the output of the welding power source is a series of current pulses. The average welding current is adjusted by controlling the frequency of the current pulses and the peak arc voltage is independently controllable by a separate arc voltage control circuit.

Conductor 61 connects the weld current command signal from the programmable controller 6 to the input of a first electronic potentiometer simulator circuit 1. The input current command signal is transformed by a pulse width modulator 12 into a signal whose duty cycle represents the input signal level. For repetitive rectangular pulses, the duty cycle is the ratio of the duration to the period of the pulses. Isolator 14 provides complete direct current isolation between the pulse width modulator and subsequent circuits. The isolator output signal is the control signal for an analog multiplexer 16. The multiplexer switches between connections, 161 and 162, to a welding current control circuit 34 depending upon the instantaneous level of the pulsed width modulated control signal from the isolator. The output of the analog multiplexer depends upon the duty cycle of the signal. The multiplexer output is time-averaged by an integrator 18 to provide an output control signal. In this case, the potentials on connector 161 and 162, and thus the high and low limits of the output control signal, are fixed at 0 and 10 volts which correspond to a duty cycle of 0 or 1, respectively.

Conductor 35 connects the integrator output to the welding current control circuit 34. This circuit sends signals to a frequency control circuit 36 and an arc voltage control circuit 46 which together control a welding power circuit 32 to provide the desired power to the welding arc. A wire feed circuit 42 adjusts the wire feed speed in response to the welding current control circuit 34.

Arc current feedback is returned along path 38 from the welding arc 5 to the welding current control circuit 34 where it is compared with the control signal from integrator 18 and the difference sent to the frequency control circuit 36. The frequency control circuit then changes the output frequency to correct for any error in welding current.

A nominal arc voltage is set by the arc voltage control circuit 46 based upon a signal from the welding current control circuit 34. The voltage at the arc 5 is fed back along path 48 to a voltage feedback circuit 44. The programmable controller also provides a voltage trim command signal. Conductor 62 connects this voltage trim command to the input of a second electronic potentiometer simulator circuit 2. Pulse width modulator 22, isolator 24, analog multiplexer 26, and integrator 28 function in the same manner as the corresponding elements of the first potentiometer simulator 1.

Analog multiplexer 26 switches between high and low potential signals obtained from the voltage feedback circuit depending upon the duty cycle of the pulses received from pulse width modulator 22. The arc voltage control circuit 46 adjusts the arc voltage in response to the control signal from integrator 28. For example, if the voltage trim command signal is set to provide a pulse with modulated signal with a duty cycle of 0.5, the output welding voltage will be the nominal arc voltage set by the welding current control circuit 34. As the command signal and the duty cycle of the pulse width modulated signal change, the arc voltage will be adjusted upward or downward from the nominal arc voltage by the corresponding percentage. Since the arc voltage feedback path circuit 44 is floating, the high and low potentials sampled by the analog multiplexer 26 vary with the feedback signal. However, the potentiometer simulator is such that the output of the integrator 28 will follow variations in the arc voltage feedback signal and provide a control signal to the arc voltage control circuit in accordance with the voltage trim command signal from programmable controller 6.

Figure 2:
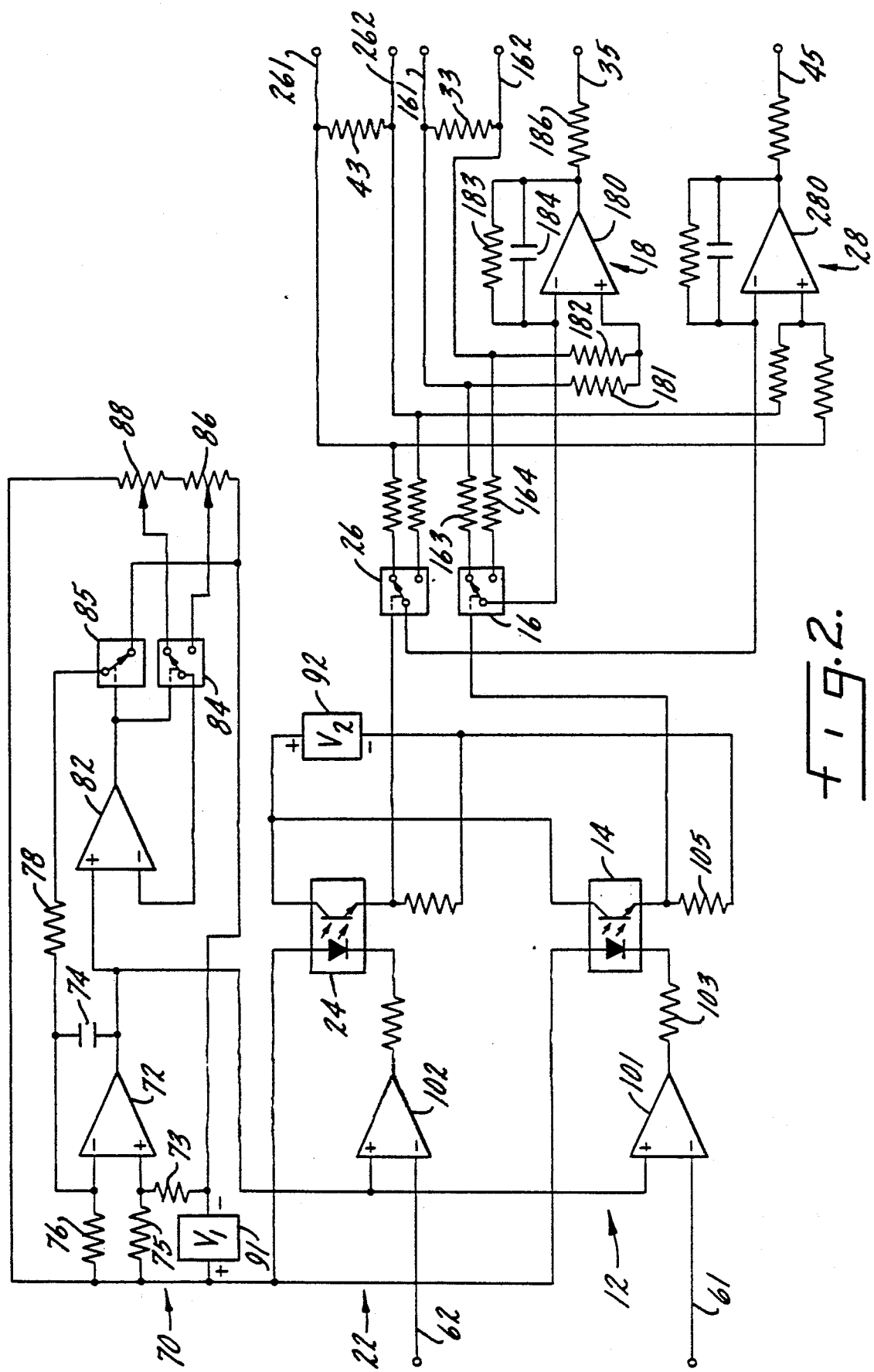
FIG. 2 is a schematic diagram of two electronic potentiometer simulator circuits according to the present invention.

A schematic diagram of two electronic potentiometer simulator circuits is shown in FIG. 2. Various filtering components and power supply connections have been omitted for clairty. In the preferred embodiment, the pulse width modulators 12 and 22 of the two potentiometer simulator circuits share a common linear ramp oscillator 70. In this oscillator, amplifier 72 and feedback capacitor 74 generate a decreasing ramp which is connected to the non-inverting input of amplifier 82. The output of amplifier 82 is connected to the control inputs of two analog multiplexers. These multiplexers, 84 and 85, are actually CMOS integrated curcuits, such as National Semiconductor Model CD4053, but in FIG. 2 they are represented by functionally equivalent circuits as a single-pole double-throw switch and a single-pole single-throw switch, respectively. While the ramp is decreasing, the switch 85 is open and multiplexer 84 connects the inverting input of amplifier 82 to the tap of potentiometer 86. When the ramp decreases to the level set by potentiometer 86, amplifier 82 goes low, switch 85 connects a resistor 78 to ground which discharges capacitor 74 and resets the start of the linear ramp. At the same time, multiplexer 84 connects the inverting input of amplifier 82 to the tap of potentiometer 88 which sets the level of the top of the ramp. Thus, the linear ramp output of oscillator 70 has a repetition rate determined by the values of a resistor 76 and capacitor 74, an upper level determined by the setting of potentiometer 88 and a lower level determined by the setting of potentiometer 86.

The repetitive ramp from oscillator 70 is connected to the non-inverting input of comparitor 101 which is part of pulse width modulator 12. Conductor 61 connects the inverting input of amplifier 101 to the weld current command output of the programmable controller 6. The output of comparitor 101 is a series of rectangular pulses whose width is determined by the time required for the linear ramp to cross the level of the weld current command signal and whose period is the reciprocal of the ramp repetition rate.

Isolator 14 is a photon coupled isolator in which an infrared-emitting diode produces infrared pulses which have the same width as the pulses from the comparitor 101. The infrared pulses are detected by a phototransistor integral with isolator 14. Direct current isolation is enabled because the infrared emitting diode, comparitor 101 and oscillator 70 are powered by a first direct current supply 91 and the phototransistor and subsequent circuitry of the potentiometer simulator 1 are powered by a second direct current supply 92. Pulse width modulation maintains linearity between the isolator input and output even though the infrared emission and detection are non-linear processes.

The pulsed output from the phototransistor is the control input to an analog multiplexer 16 which, like multiplexer 84, is actually a CMOS integrated circuit but which, for convenience, is schematically represented by a single-pole double-throw switch. One terminal of the switch is connected through a resistance 163 and conductor 161 to the high control potential limit of the welding current control circuit 34 of power source 3. The second terminal of the switch is connected through a resistance 164 and conductor 162 to the low control potential limit of circuit 34. Analog multiplexer 16 operates to connect the pole of the switch to the low potential conductor for the duration of each pulse from isolator 14 and to connect it to the high potential conductor 162 otherwise. The pole of switch 16 is connected to the inverting input of an amplifier 180. The high and low potential limits are also connected through resistances 181 and 182, respectively, to the non-inverting input of amplifier 180. Thus, the potential at the non-inverting input is the midpoint of the high and low potential limits. Resistor 183 and capacitor 184 provide feedback so that the gain is unity and amplifier 180 integrates the output of multiplexer 16 and the midpoint of the high and low potential limits. The output of the integrator 18 is a signal whose level depends upon the weld current command signal from the programmable controller. Resistor 186 and conductor 35 connect this control signal to the welding current control circuit 34.

In effect, a manual control potentiometer of welding current control circuit 34 is replaced by the simulator 1 which includes a fixed resistor 33 connected between conductors 161 and 162 which connect to the high and low control potential limits of circuit 34. The magnitude of resistance 33 is chosen to be compatible with power source circuit 34 and resistances 163, 164, 181 and 182 are high compared with resistance 33 so as to minimize their effect on circuit 34. The impedance of the simulator output, integrator 180, depends upon the resistance 186 which may be low or high as desired.

The feedback elements of ramp generating amplifier 72 and integrating amplifier 180 are such that the ramp frequency is sufficiently high to avoid ripple in the integrator output but yet provide a time constant of the simulator circuit compatible with the welding process and the circuits of the power source and programmable controller.

In the preferred embodiment, resistance 86 is 220 Ω; resistance 186 is 470 Ω; resistances 75 and 103 are 1 kΩ; resistance 33 is 5 kΩ; resistances 76, 78, 88 and 105 are 10 kΩ; resistances 73, 163, 164, 181, 182 and 183 are 100 kΩ; capacitance 74 is 0.001 μF and capacitance 184 is 0.47 μF.

The output of the ramp oscillator 70 is also connected to the non-inverting input of comparitor 102 of the pulse width modulator 22 in the second potentiometer simulator 2. A separate oscillator may be used if the range of the second command signal is different from the first. Conductor 62 connects the voltage trim command signal from programmable controller 6 to the inverting ;nput of comparitor 102. Comparitor 102, isolator 24, analog multiplexer 26 and integrator 28 all operate in the same manner as the corresponding elements of simulator 1. Connectors 261 and 262 to the high and low potential sides of resistor 43 are multiplexed and integrated with their midpoint to provide a control signal which conductor 45 connects to the arc voltage control circuit 46 of the welding power source 3.

From the preceding, the voltage signal at the non-inverting input of one of the integrating amplifiers is $E_n = (A+B)/2$ where A is the low potential and B is the high potential connected to the corresponding multiplexer. The time averaged signal at the inverting input is $E_i = B - d(B-A)$ where d is the duty cycle of the pulse width modulated signal from the modulator. Thus, the output potential of the integrator is $E_o = E_n - (E_i - E_n) = A + d(B-A)$. From this expression for the output, it is apparent that the output simulates the signal from the tap of a potentiometer connected between potentials A and B. The potentials A and B may be grounded or floating as desired and the output varies linearly with the duty cycle d of the pulse width modulated signal derived from the input command signal.

The embodiment of FIG. 2 simulates a linear potentiometer because the duty cycle d of the pulse width modulator is a simple linear function of the input command signal. If desired, the invention may be adapted to simulate a potentiometer characteristic which is compound linear, e.g. has multiple separate regions of different slopes, or logarithmic by altering the form of the output of the oscillator 70 which is compared with the input command signal.

The present invention has been described in terms of specific embodiments. It is of course possible to make various modifications of the specific circuits without departing from the general principles and scope of the invention as defined by the claims.

What is claimed is:

1. Apparatus for providing an output control signal having a characteristic value variable between high and low limits represented by applied first and second respective limit signals comprising:
   means responsive to a variable analog input control signal for producing an intermediate digital pulse width modulated signal having a variable duty cycle which corresponds to and is produced as a function of variations in said analog input control signal;
   means for isolating said intermediate pulse width modulated signal from said analog input control signal to effecuate direct current isolation of said output control signal from said input control signal;
   an analog multiplexer with first and second inputs for receiving said first and second applied respective limit signals with a control input coupled to said isolated pulse width modulated signal with said applied first or said applied second limit signal switched to an output line of said multiplexer in response to said isolated pulse width modulated signal; and integrated means, coupled to said output line of said analog multiplexer, for time-averaging said switched signal on said output line to form said output control signal.

* * * * *